(12) United States Patent
Goto et al.

(10) Patent No.: US 6,502,832 B2
(45) Date of Patent: Jan. 7, 2003

(54) AUTOMOTIVE SEAL COMPONENT FOR VEHICLE DOOR

(75) Inventors: Teruhito Goto, Nishikasugai-gun (JP); Yuzuru Yamaguchi, Nishikasugai-gun (JP)

(73) Assignee: Toyoda Gosei Co., Ltd., Aichi (JP)

( * ) Notice: Subject to any disclaimer, the term of this patent is extended or adjusted under 35 U.S.C. 154(b) by 7 days.

(21) Appl. No.: 09/768,261

(22) Filed: Jan. 25, 2001

(65) Prior Publication Data

US 2001/0010417 A1 Aug. 2, 2001

(30) Foreign Application Priority Data

Jan. 27, 2000 (JP) ........................................ 2000-018915
Feb. 28, 2000 (JP) ........................................ 2000-051532

(51) Int. Cl.$^7$ .............................................. F16J 15/02
(52) U.S. Cl. ............................................................ 277/642
(58) Field of Search ................................. 277/640, 642, 277/647, 648, 906, 921

(56) References Cited

U.S. PATENT DOCUMENTS

| 4,817,336 A | 4/1989 | Kisanuki |
| 4,894,954 A | 1/1990 | Nozaki et al. |
| 5,463,832 A | * 11/1995 | Eckart |
| 5,505,602 A | 4/1996 | Sumi |
| 5,779,956 A | * 7/1998 | Hollingshead et al. |
| 6,237,287 B1 | * 5/2001 | Nakagawa et al. |
| 6,240,677 B1 | * 6/2001 | Baumann |

FOREIGN PATENT DOCUMENTS

JP 8-25976 1/1996

\* cited by examiner

*Primary Examiner*—Anthony Knight
*Assistant Examiner*—Karlena D. Schwing
(74) *Attorney, Agent, or Firm*—Pillsbury Winthrop LLP

(57) ABSTRACT

A glass run portion and an inner weather strip of a door are made integral with each other via a molded portion. A seal lip portion is provided on the molded portion which is adapted to contact an inner side of a window glass and to continuously connect a laterally inner seal lip of the glass run portion with a seal lip of the inner weather strip. Owing to this, seal lines of both the glass run portion and the inner weather strip are made continuous with each other via a seal line of the seal lip portion which contacts the inner side of the window glass.

6 Claims, 7 Drawing Sheets

AUTOMOTIVE SEAL COMPONENT FOR VEHICLE DOOR

BACKGROUND OF THE INVENTION

1. Field of the Invention

The present invention relates to an automotive seal component such as a weather strip adapted to be mounted on a door of a vehicle.

The present application is based on Japanese Patent Applications Nos. 2000-18915 and 2000-51532, which are incorporated herein by reference.

2. Description of the Related Art

Conventionally, an automotive seal component is mounted around a circumference of a window glass of a door of a vehicle with a view to guiding the up and down movement of the window glass and to preventing the intrusion of water, dust, noise or the like from the outside into the inside of the vehicle. FIG. 6 shows such an automotive seal component. This automotive seal component is provided around the circumference of the window glass of the door of the vehicle and comprises a glass run portion 101 mounted on a window frame of the door and an inner weather strip 102, which is disposed along a belt line portion of the door. Front and rear ends of the inner weather strip 102 are integrally connected to the glass run portion 101 provided at the front and rear sides of the inner weather strip 102 via molded portions 103, respectively. Additionally, the glass run portion 101 has a pair of seal lips 105, 106 adapted to sliding contact sides of a window glass 104. On the other hand, the inner weather strip 102 is disposed along the belt line portion of the door or a flange portion of a door panel constituting a horizontal frame portion on a lower side of the window frame. This inner weather strip 102 has a trim portion 107 fixed to the flange portion and seal lips 108, 108 which are brought into sliding contact with one side of the window glass 104 together with the trim portion (refer to Japanese Patent Publication No. Hei. 8-25976).

According to above described art, however, the molded portion 103 has a lip portion 103a continuous with the vertically extending seal lip 105 of the glass run portion 101 and lip portions 103b, 103b continuous, respectively, with the horizontally extending seal lips 108, 108 of the inner weather strip 102. In other words, the glass run portion 101 and the inner weather strip portion 102 are made integral via the molded portion 103 such that end portions of the respective lip portions 103b connect with the lip portion 103a. Due to this, a portion is formed in the molded portion 103 where the continuity between a seal line 109 where the seal lip 105 comes into sliding contact with one side of the window glass 104 and seal lines 110 where the seal lips 108 come into sliding contact with the one side of the window glass 104 disconnects or both the seal line 109 and the seal lines 108 are not continuous with each other. Namely, a gap 111 (a portion where the continuity of the seal lines is cut) as shown in FIG. 7 is formed. Thus, there is caused a problem that the gap so formed eventually allows external noise such as wind and tire noise to intrude therethrough into the passenger compartment of the vehicle while the vehicle is running.

Further, another example of the automotive seal component is described hereinafter.

As shown in FIG. 9, a continuous weather strip (hereinafter, referred to as a "glass run") 5 is mounted on a door frame 1 and a window frame (not shown) of a vehicle which widow frame extends between door panels at front and rear ends thereof. As shown in FIG. 10, the glass run 5 comprises seal lips 52 for holding therebetween a circumference of a window glass 104 that are formed along distal sides of facing side walls 51 of a main body 50 which has a substantially U-shaped cross section, whereby the window glass 104 is guided up and down movement, and the window glass 104 is sealed at the circumference thereof when the window glass 104 is closed.

Additionally, as shown in FIGS. 9 and 11, glass weather strips (hereinafter, referred to as a "inner weather strip or outer weather strip") 6A, 6B each provided with double seal lips which are arranged vertically (or with a single seal lip) are mounted on upper edges (belt lines) of a door inner plate 2 and a door outer plate (not shown), respectively, and the seal lips 61, 62 hold the window glass 104 from both sides thereof and wipe the surfaces of the window glass 104 when it moves up and down.

The inner weather strip 6A inside the passenger compartment of the vehicle is generally used to mount on the inner door panel 2 by bringing the front and rear ends thereof into abutment with front and rear vertical portions of the glass run 5. Recently, however, as shown in FIGS. 8A and 9, a construction has come to be adopted in which the ends and the vertical portions are connected together to be made integral through molding.

To carry out the molding connection, the glass run 5 and the ends of the inner weather strip 6A are set inside assembled mold members in such a manner as to face each other substantially at right angles via a cavity, and thereafter a molding material is injected into the cavity to thereby form molded connecting portions 7 each provided with the seal lips 71 constituting extensions to the seal lips 61 of the inner weather strip 6A as shown in FIG. 12. In this case, to facilitate the release of the mold members after molding is completed, the mold members are assembled together such that parting lines (dividing surfaces) between the mold members match distal end lines of the seal lips 71.

It is inevitable that burrs are produced on molded products along the parting lines when molding is carried out using the assembled mold members. In a case where the molded connecting portion 7 is molded, as shown in FIG. 12, burrs 8 are formed on the distal end lines of the seal lips 71. It is difficult to perfectly cut the burrs 8 so produced, and therefore they are brought into contact with the surface of the window glass 104. When the window glass 104 moves up and down, the burrs 8 start to get worn from distal ends thereof, and fine worn particles stick to the surface of the window glass, whereby not only doest the surface of the glass window get dirty but also the sliding resistance is increased, leading to a risk that the up and down movement of the window glass 104 is disrupted. To cope with this, they make it a practice to apply a lubricant to the surface of the molded connecting portion 7, but it is difficult for the lubricant to be securely applied to distal ends of the burrs 8, and therefore it is not possible to attain intended effects.

SUMMARY OF THE INVENTION

The present invention was made in view of the aforesaid circumference, and an object thereof is to provide an automotive seal component such as a weather strip which can improve the quietness inside the passenger compartment while the vehicle is running by improving the sealing properties of the automotive seal component relative to a window glass of a door of the vehicle.

Another object thereof is to provide a weather strip which can eliminate a risk that the burrs produced on the seal lips of the molded connecting portion which connects the inner weather strip to the glass run deteriorate the window glass wiping capability of the seal lips and/or increase the resistance against the sliding window glass.

With a view to attaining the object, according to a first aspect of the invention, there is provided an automotive seal component in which a glass run portion provided along a circumference of a window glass of a door and mounted on a window frame of the door and front and rear ends of an inner weather strip disposed along a belt line portion are made integral via molded portions, the automotive seal component being characterized in that the molded portions each have provided thereon a seal lip portion adapted to be brought into sliding contact with one side of the window glass and to continuously connect a seal lip of the glass run portion with a seal lip of the inner weather strip.

According to the first aspect of the invention, the seal lips of both the glass run portion and the inner weather strip are connected to each other via the seal lip portion of the molded portion which is brought into sliding contact with one side of the window glass continuously together with the seal lips of both the glass run portion and the inner weather strip. This allows respective seal lines of the seal lips brought into sliding contact with the one side of the window glass become continuous with each other via a seal line of the seal lip portion provided on the molded portion which is brought into sliding contact with the one side of the window glass, whereby the formation of a portion where the continuity of the seal lines disconnects or a gap is prevented, thereby making it possible to improve the sealing properties of the automotive seal component relative to the window glass.

According to a second aspect of the invention, there is provided an automotive seal component as set forth in the first aspect, wherein the seal lip of the inner weather strip extends downwardly relative to the one side of the window glass so as to come into sliding contact with the one side of the window glass on a lower side thereof.

According to the second aspect of the invention, in addition to the operation as set forth in the first aspect, the direction in which the downwardly oriented seal lip of the seal member deforms is identical to the direction in which the seal lip of the glass run portion does. This facilitates the integration of the seal lips of both the glass run portion and the inner weather strip via the molded portion and prevents the generation of wrinkles even when the seal lips deform.

Additionally, according to a third aspect of the invention, there is provided an automotive seal component as set forth in the second aspect, wherein a lower edge portion of the seal lip of the inner weather strip extends farther than where the seal lip abuts with the one side of the window glass in a direction in which the seal lip goes away from the one side of the window glass.

According to the third aspect of the invention, in addition to the operation as set forth in the second aspect, an upper edge of the window glass is prevented from entering the inside of the seal lip of the inner weather strip by the portion extending from the lower edge portion of the seal lip when the window glass moves up from a lowered position.

According to a fourth aspect of the invention, there is provided an automotive seal component as set forth in the second aspect, wherein the seal lip portion of the molded portion is formed into a closed configuration for sliding contact with the one side of the window glass at a portion where the seal lip portion of the molded portion connects to the seal lip of the inner weather strip.

According to the fourth aspect of the invention, in addition to the operation as set forth in the second aspect, the position of the upper edge of the window glass is controlled by the closed portion of the seal lip portion when the window glass moves up from the lowered position. This prevents the upper edge of the window glass from entering the inside of the seal lip of the inner weather strip from the lower edge thereof.

According to a fifth aspect of the invention, there is provided an automotive seal component as set forth in any of the first to fourth aspects, wherein an auxiliary seal lip is provided on the glass run portion at a position closer to an end of the window glass than the seal lip of the glass run portion, the auxiliary seal lip extending in a direction parallel to a longitudinal direction of the seal lip of the glass run portion and being brought into sliding contact with the one side of the window glass.

According to the fifth aspect of the invention, in addition to the operation as set forth in any of the first to fourth aspects, in a case where there is provided an undercut portion in the seal lip of the glass run portion below the seal lip portion to facilitate the molding of the molded portion, although there is formed at the position where the undercut portion is provided a portion where the seal lip is not brought into sliding contact with the window glass, the auxiliary seal lip of the glass run portion compensates for the deterioration in sealing properties thereat.

Further, in a view to attaining another object, according to a sixth aspect of the invention, there is provided an automotive weather strip which comprises seal lips for wiping an inner surface of a door glass and in which front and rear ends of a weather strip mounted along a belt line of an inner door panel connect to a weather strip mounted along an inner circumference of a door frame via molded connecting portions and each comprising seal lips which constitute extensions to the seal lips, the automotive weather strip being characterized in that burrs which are produced on the seal lips of the connecting portions along parting lines between molds when molding the connecting portions are positioned along distal side edges on backs of the seal lips which are not in contact with the window glass.

According to a seventh aspect of the invention, in addition to the operation as set forth in the second aspect, rib-like projections are formed on backs of the seal lips of the molded connecting portion which are not in contact with the window glass in such a manner as to extend along distal side edges of the seal lips, so that burrs which are produced on the seal lips of the connecting portions along parting lines between assembled mold members when molding the molded connecting portions are positioned on apex lines of the projections.

Since the burrs are constructed so as to be positioned away from the contact surfaces of the seal lips, there is no problem that would be caused by the contact between the burrs and the window glass. In addition, since the burrs are constructed so as to be formed on the apex lines of the projections, the release of the mold members can be facilitated when molding the connecting portions.

Features and advantages of the invention will be evident from the following detailed description of the preferred embodiments described in conjunction with the attached drawings.

DETAILED DESCRIPTION OF THE PREFERRED EMBODIMENTS

Figure 1:
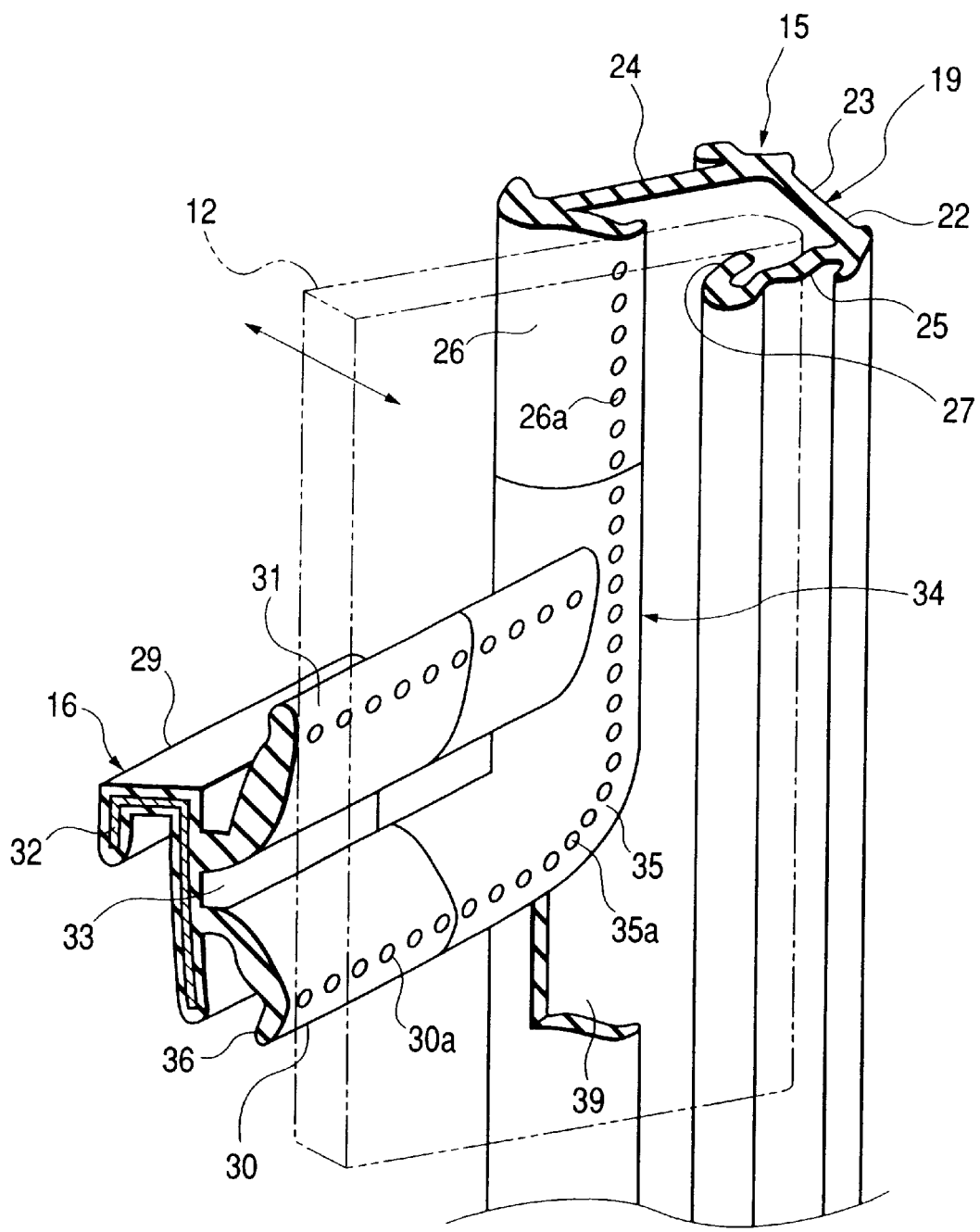
FIG. 1 shows a perspective view showing a main portion of an automotive seal component according to an embodiment of the invention.
Figure 2:
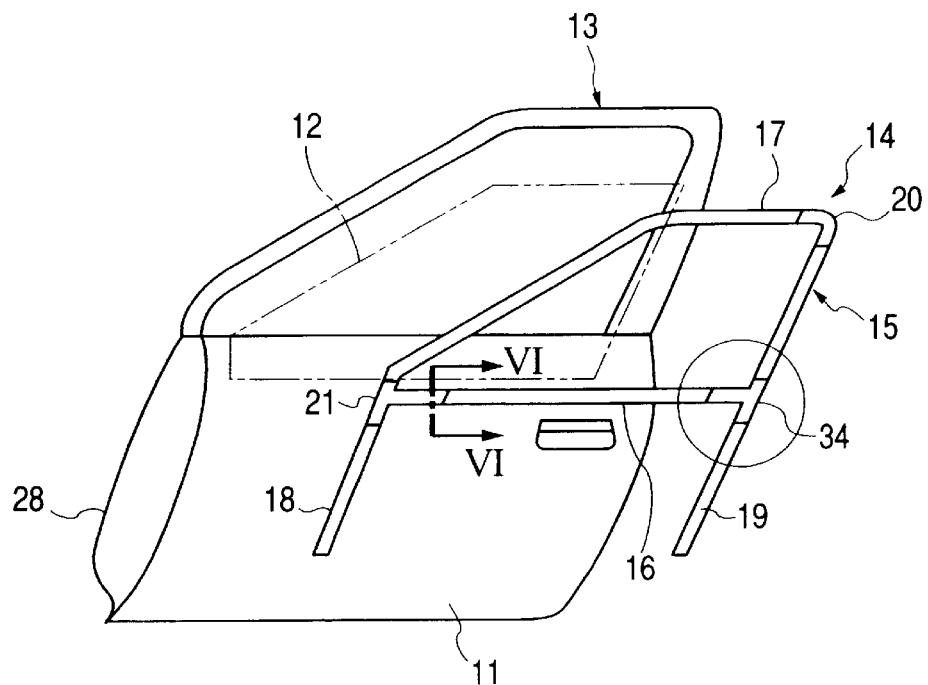
FIG. 2 shows an exploded perspective view showing the automotive seal component and a door.
Figure 3:
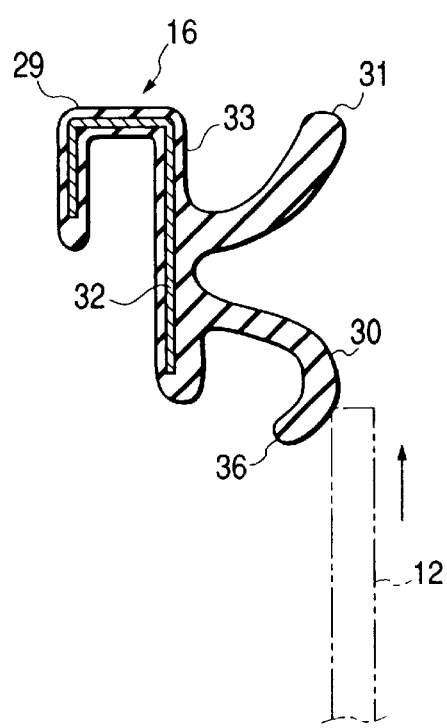
FIG. 3 shows a vertical cross-sectional view of an inner weather strip shown in FIG. 1.

Referring to FIGS. 1 to 3, one embodiment of the invention will be described below in which an automotive seal component according to the present invention is embodied into a weather strip provided around the circumference of a window glass of a door of a vehicle.

As shown in FIG. 2, a window frame 13 is formed on a door 11 of a vehicle which conforms to an outer circumferential configuration of a window glass 12. A weather strip 14 is provided on an inner circumferential side of the window frame 13 as an automotive seal component. This weather strip 14 is made up of, for instance, a rubber such as ethylene-propylene-diene terpolymer (EPDM), a thermoplastic elastomer such as thermoplastic olefin elastomer (TPO), a flexible synthetic resin such as flexible polyvinyl chloride or a polymer blend thereof. Additionally, the weather strip 14 comprises a glass run portion 15 and an inner weather strip 16 as a seal member for a belt line of the door.

The glass run portion 15 is provided at a circumference portion of the window glass 12 and is mounted on the window frame 13. This glass run portion 15 comprises a plurality of glass runs 17 to 19 and a molded corner portion 20. The respective glass runs 17 to 19 are formed through a known extrusion method so as to conform to configurations of respective frame portions of the window frame 13 except for a lower edge portion thereof and thereafter they are cut to predetermined lengths. The molded through a known injection molding method so as to conform to the configuration of a corner portion of the window frame 13. The upper edge side glass run 17 and the rear edge side glass run 19 are connected to each other via the molded corner portion 20. In addition, the glass run 17 and the front edge side glass run 18 are connected to each other via a front side molded portion 21.

As shown in FIG. 1, a main body portion 22 having a substantially U-shaped cross section is formed in the center of the glass run 19. This main body portion 22 comprises a bottom wall portion 23, a laterally inner side wall portion 24 and a laterally outer side wall portion 25, the inner wall portion 24 and the outer wall portion 24 extending in a longitudinal direction from ends of the main body portion 22. A laterally inner seal lip 26 is formed on a distal end of the inner side wall portion 24 in such a manner as to protrude therefrom toward the bottom wall portion 23. In addition, a laterally outer seal lip 27 is formed on a distal end of the outer wall portion 25 in such a manner as to extend therefrom so as to correspond to the inner seal lip 26. The seal lips 26, 27 are constructed so as to be brought into resilient sliding contact with inner and outer surfaces of the window glass 12. Moreover, the seal lips 26, 27 function not only to guide the window glass 12 when it moves up and down within the glass run 19 but also to seal the inside of the passenger compartment from the outside thereof when the window glass 12 is closed. Then, the main body portion 22 of the glass run 19 is constructed so as to be retained in a rear side frame portion of the window frame 13. Note that the glass runs 17, 18 also have a construction similar to that of the glass run 19.

As shown in FIGS. 1 to 3, the inner weather strip 16 is disposed along the belt line portion of the door 11, i.e., a flange portion (not shown) of an inner door panel 28 constituting a lower edge horizontal frame portion of the window frame 13. This inner weather strip 16 comprises a trim portion 29 extending horizontally and two seal lips 30, 31 extending in a longitudinal direction of the trim portion.

The trim portion 29 is formed so as to have a substantially unshaped cross section and is constructed so as to be retained on the belt line portion of the door 11 by holding the flange portion of the inner door panel 28 with flange holding lips, not shown, which are provided so as to protrude therein. Additionally, a single insert 32 is embedded in the interior of the trim portion 29.

The seal lips 30, 31 both are formed so as not only to extend from a laterally outer side wall 33 of the trim portion 29 but also to protrude laterally outwardly. One of the seal lips 30 is constructed so as to extend downwardly relative to the inner side (one side) of the window glass 12 to thereby be brought into resilient sliding contact with the inner side of the window glass on a lower edge side thereof. The other seal lip 31 is constructed so as to extend upwardly relative to the inner side of the window glass 12 to thereby be brought into resilient sliding contact with the inner side of the window glass on an upper side thereof.

In addition, as shown in FIGS. 1 and 2, the glass run portion 15 and the front and rear ends of the inner weather strip 16 are made integral with the molded portion 21 and a molded portion 34, respectively. The glass run 19 and the rear end of the inner weather strip 16 are made integral with the rear end molded portion 34. A seal lip portion 35 is provided on the molded portion 34 which comes into sliding contact with the inner side of the window glass 12 and continuously connects the laterally inner seal lip 26 of the glass run 19 with the seal lip 30. This seal lip portion 35 is formed into an arc-like configuration so that a cut-away end portion of the laterally inner seal lip 26 which extends vertically is connected to a rear end of the seal lip 30.

In addition, the seal lip portion 35 resiliently slide contacts the inner side of the window glass 12 together with the seal lips 26, 30 and is given such a thickness that allows it to be continuous with the seal lips 26, 30. In other words, the seal lip portion 35 constitutes a single seal lip which resiliently deforms together with the seal lips 26, 30. Thus, seal lines 26a, 30a along which the seal lips 26, 30 come into sliding contact with the inner side of the window glass 12 are made continuous with each other via a seal line 35a along which the seal lip portion 35 provided on the molded portion 34 comes into sliding contact with the inner side of the window glass 12. Note that in FIG. 1, while the aforesaid seal lines 26a, 30a, 35a are shown as a series of small circles as a matter of convenience, the respective seal lines constitute a single continuous line.

Note that a seal lip portion similar to that of the rear end molded portion 34 is also formed on the front end molded portion 21 which integrally connects the front end of the inner weather strip 16 with the glass runs 17, 18. A seal lip of the glass run 17 and the seal lip 30 of the inner weather strip 16 are connected to each other via the seal lip portion.

In addition, as shown in FIGS. 1 to 3, an extended portion 36 is formed on a lower edge portion of the seal lip 30 of the inner weather strip 16 which extends farther than where the seal lip 30 contacts the inner side of the window glass 12 in a direction in which the seal lip 30 goes away from the inner side of the window glass 12. This extended portion 36 functions to prevent the upper edge of the window glass 12 from entering the inside of the seal lip 30.

On the other hand, a rear end of the seal lip 31 of the inner weather strip 16 is constructed only to abut with the external surface of the laterally inner seal lip 26 of the glass run 19, whereas a front end of the seal lip 31 is constructed only to abut with the external surfaces of the seal lips (not shown) of the glass runs 17, 18. In other words, it is preferred that the front and rear ends of the seal lip 31 are not made integral with the glass run portion 15, so that a force acting on the seal lip 31 is prevented from acting on the seal lip portion 35 of the glass run portion 15.

According to the embodiment of the invention which is constructed as described heretofore, the following operations and advantages can be provided.

(1) The seal lips 26, 30 of the glass run 19 and the inner weather strip 16 are continuously connected with each other via the seal lip portion 35 of the molded portion 34. Owing to this, the seal lines 26a, 30a of the respective seal lips 26, 30 are made continuous with each other via the seal line 35a of the seal lip portion 35. This prevents the formation of a portion where the seal lines disconnects or a gap between the two seal lips 26, 30 and the seal lip portion 35 and the inner side of the window glass 12, thereby making it possible to improve the sealing properties of the glass run portion 15 and the inner weather strip 16 relative to the window glass 12. Thus, good sealing properties of the automotive seal component can be obtained and the quietness inside the passenger compartment while the vehicle is running can be improved.

(2) The seal lip 30 of the inner weather strip 16 extends downwardly relative to the inner side of the window glass 12 so as to be brought into resilient sliding contact with the inner side of the window glass at the lower edge side thereof. Owing to this, the direction in which the downward seal lip 30 deforms becomes identical to that in which the seal lip of the glass run 19 does. This facilitates the integration of the seal lips 26, 30 by the seal lip portion 35 of the molded portion 34.

(3) The extended portion 36 is formed on the lower edge portion of the seal lip 30 of the inner weather strip 16 which extends and bends farther than where the seal lip 30 contacts the inner side of the window glass 12 in the direction in which the seal lip 30 goes away from the inner side of the window glass 12. This extended portion 36 functions to prevent the upper edge of the window glass 12 from entering the inside of the seal lip 30, which allows the window glass 12 to move up and down in a smooth fashion.

(4) The two seal lips are provided on the inner weather strip 16; the upwardly oriented seal lip 31 and the downwardly oriented seal lip 30, which are both brought into resilient sliding contact with the inner side of the window glass 12. Owing to this, good sealing properties of the inner weather strip 16 relative to the window glass 12 can be obtained.

Additionally, the embodiment according to the invention may be modified as follows.

Figure 4:
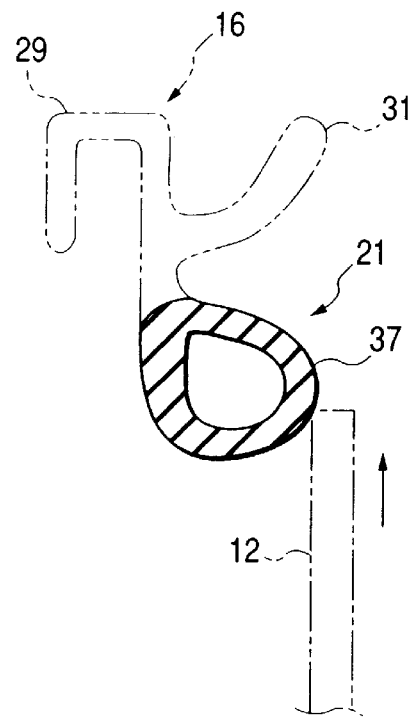
FIG. 4 shows a cross-sectional view taken along the line VI—VI in FIG. 2, showing a modification to the embodiment of the invention.

In the above embodiment, the extended portion 36 is formed on the seal lip 30 so that the upper edge of the window glass 12 is prevented from entering the inside of the seal lip 30. With this extended portion 36 being deleted or left provided, the portions of the seal lip portions 35, 37 which are provided on the molded portions 20, 21 may each be formed into a hollow closed configuration for sliding contact with the inner side of the window glass 12, as shown in FIG. 4.

In a case where the aforesaid construction is adopted, the upper position of the window glass is controlled by the external surface of the seal lip portion 37 when the upper edge of the window glass moves up from a lowered position which deviates from the lower edge of the seal lip 30. This prevents the upper edge of the window glass 12 from entering the interior of the seal lip 30 of the inner weather strip 16 from the lower edge thereof, the window glass being thereby allowed to move up and down in a smooth fashion.

Figure 5:
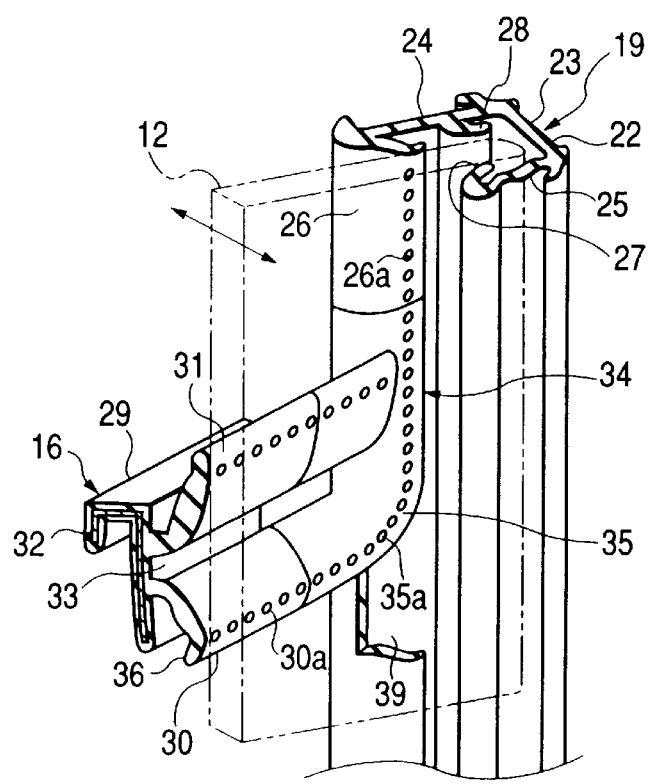
FIG. 5 shows a perspective view similar to FIG. 1, showing another modification to the embodiment of the invention.
Figure 6:
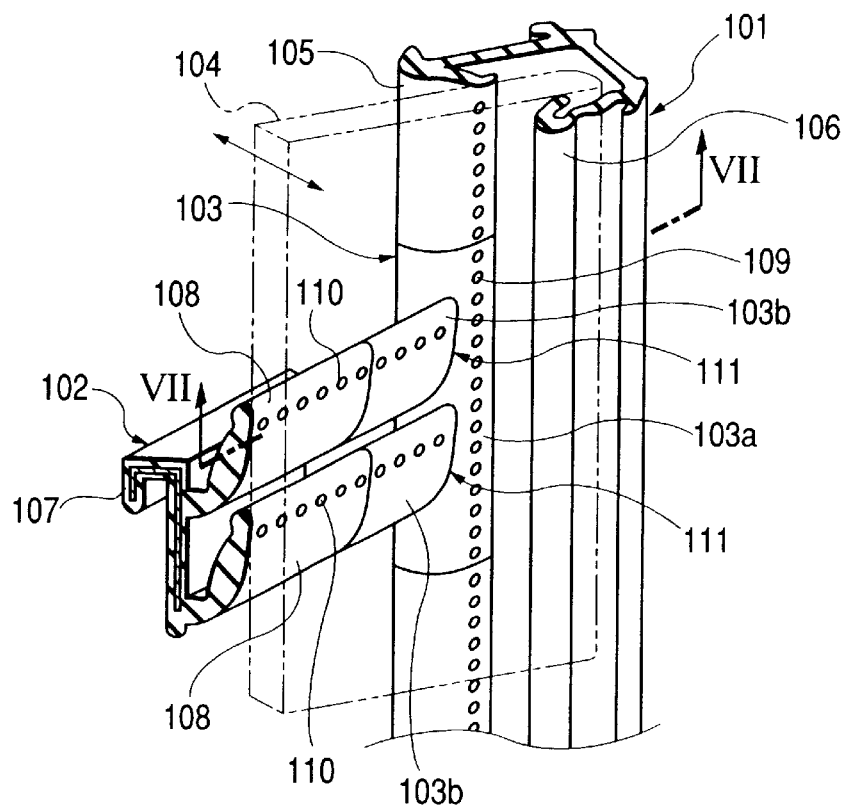
FIG. 6 shows a perspective view showing a main portion of an automotive seal component.
Figure 7:
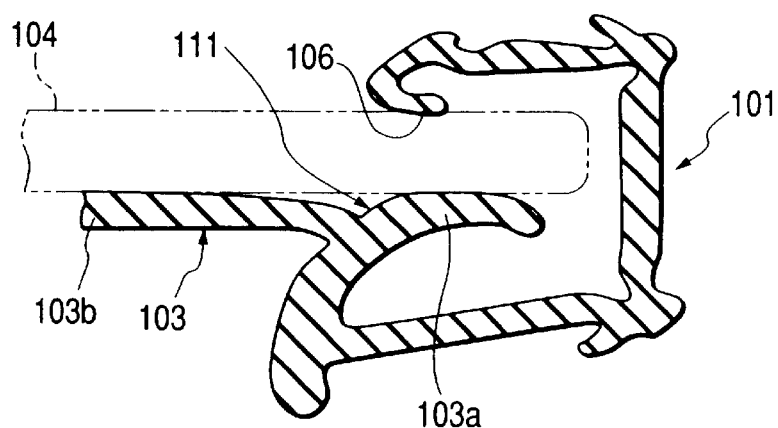
FIG. 7 shows a cross-sectional view taken along the line VII—VII in FIG. 6.

In the above embodiment, an auxiliary seal lip 28 may be provided on the rear end glass run 19 at a position closer to an end portion of the window glass 12 than the laterally inner seal lip 26, the auxiliary seal lip 28 extending in a direction parallel with the longitudinal direction of the laterally inner seal lip 26 and being brought into sliding contact with the inner side of the window glass 12, as shown in FIG. 5.

In a case where the aforesaid construction is adopted, in the event that there is provided an undercut portion 39 in the laterally inner seal lip 26 of the glass run 19 below the seal lip portion 35 to facilitate the molding of the molded portion, although there is formed at the position where the undercut portion 39 is provided a portion where the seal lip is not brought into sliding contact with the window glass 12, the auxiliary seal lip 28 compensates for the deterioration in sealing properties thereat.

In the above embodiment, while the two seal lips 30, 31 are provided on the inner weather strip 16, the upper seal lip 31 may be omitted.

In the above embodiment, while the single insert 32 is embedded in the interior of the trim portion 29, a divided insert member comprising a plurality of divided pieces may be used for the insert 32.

Described next will be a technical concept other than the aforesaid aspects of the invention which can be grasped from the above embodiment and the modifications thereto.

An automotive seal component comprising a glass run portion (15) provided a circumference portion of a window glass (12) of a door and mounted on an upper edge, a front edge and a rear edge of a window frame (13) of the door, a seal member (an inner weather strip 16) disposed along a belt line portion of the door, and front end and rear end molded portions (21, 34) for integrally connecting front and rear ends of the inner weather strip with front and rear glass runs (18, 19) of said glass run portion, respectively, the front and rear glass runs and the inner weather strip having respectively seal lips (26, 30) which are brought into sliding contact with a side of the window glass at the circumference thereof, the automotive seal component being characterized in that the respective seal lips (26) of the front and rear glass runs and the seal lip (30) of the inner weather strip are made integral with each other via the front and rear molded portions such that directions in which the seal lips (26, 30) of both the glass runs and the inner weather strip deform become identical to each other. According to this construction, seal lines (26a, 30a) of the respective seal lips (26, 30) are connected to each other via the molded portions (21, 34), and there is formed no place in the molded portions where the continuity of the seal lines disconnects. This improves the quietness inside the passenger compartment while the vehicle is running.

Another embodiment according to the invention will be described below while mainly discussing about a molded connecting portion for a weather strip.

Figure 9:
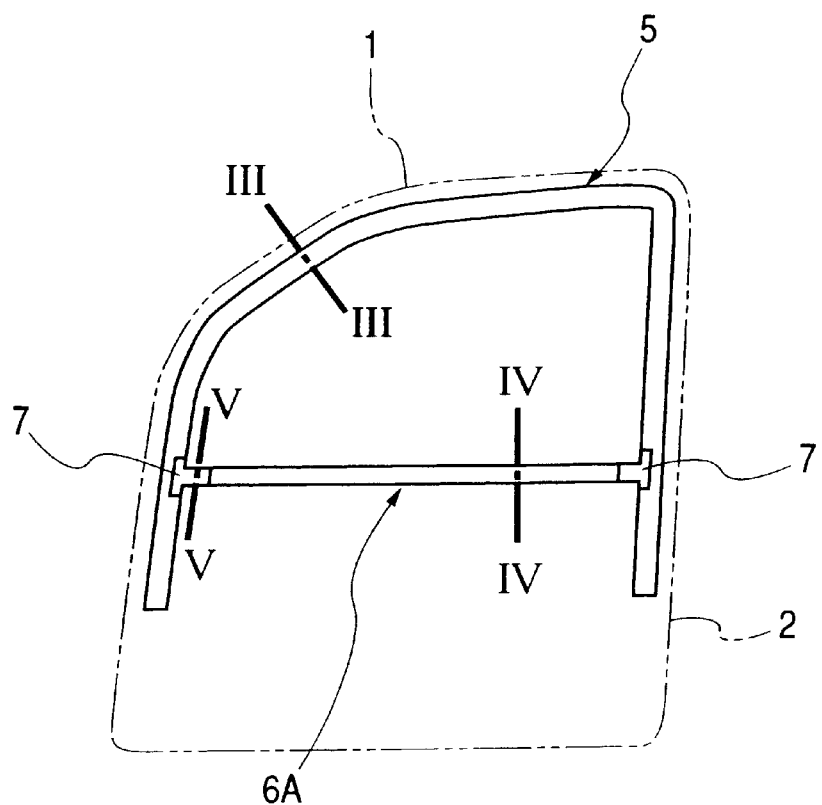
FIG. 9 shows an overall view of weather strips.
Figure 10:
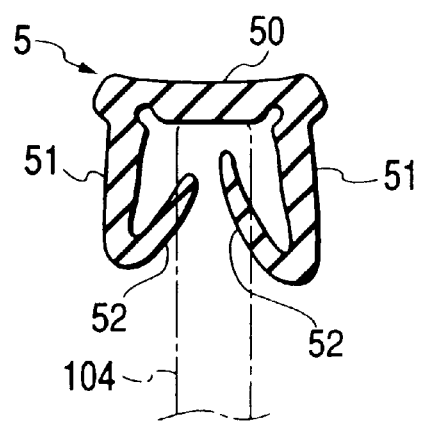
FIG. 10 shows a cross-sectional view of the weather strip taken along the line III—III in FIG. 9.

A glass run 5 (FIG. 9) mounted along a part of a door frame 1 is an extruded unit of a rubber and provided with seal lips 52 extending from opening sides of facing side walls 51 of a main body portion 50 of the glass run 5 having a substantially U-shaped cross section as shown in FIG. 10. Note that FIG. 10 shows a cross-sectional shape of the glass run 5 fitted on the door frame 1 and that in the cross-sectional shape of the extruded glass run before fitted on the door frame, the side walls 51 are spaced away wider at the opening sides than the closed sides thereof.

Figure 11:
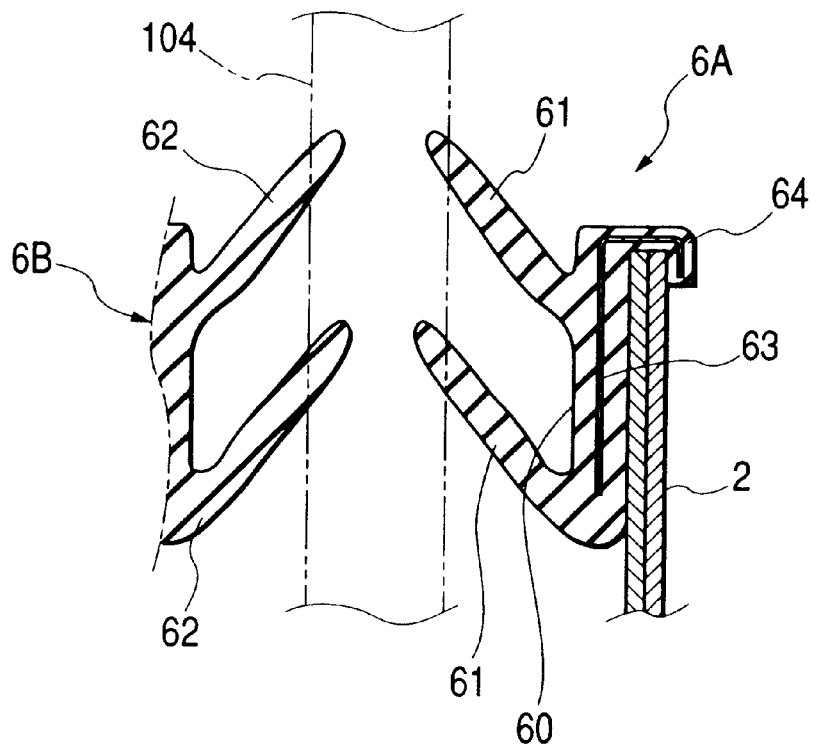
FIG. 11 shows a cross-sectional view of the weather strip taken along the line IV—IV in FIG. 9.
Figure 12:
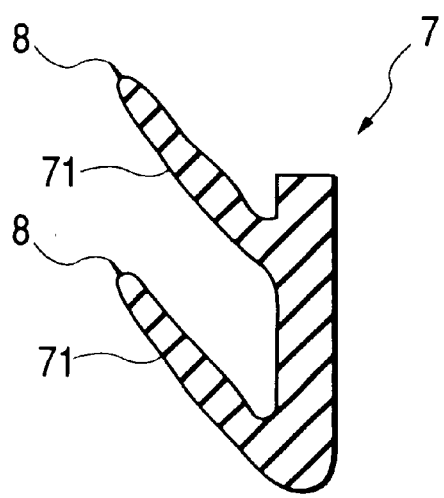
FIG. 12 shows a cross-sectional view of the construction of a conventional weather strip taken along the line V—V in FIG. 9.

The inner weather strip 6A mounted on a belt line of an inner door panel 2 is an extruded unit of a rubber and comprises, as shown in FIG. 11, a vertical wall-like main body portion 60 having an insert 63 embedded therein and a groove 64 fitted over an upper edge of the inner door panel 2 and double vertically arranged seal lips 61 extending from a side of the main body portion 60 diagonally upwardly.

Figure 8A:
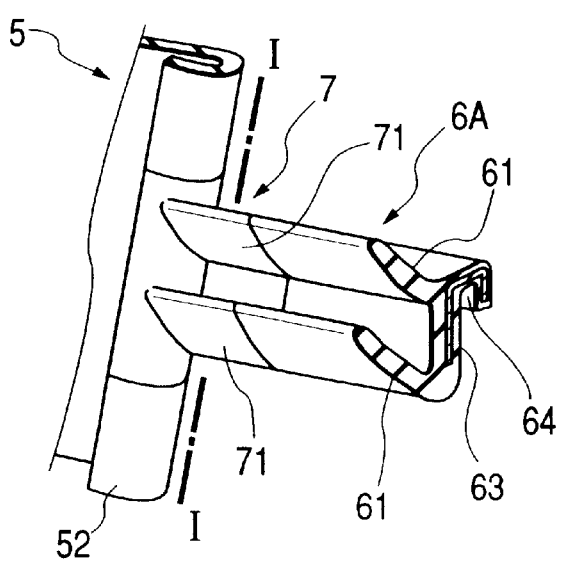
FIG. 8A shows a perspective view showing a molded connecting portion for a weather strip according to another embodiment of the invention.
Figure 8B:
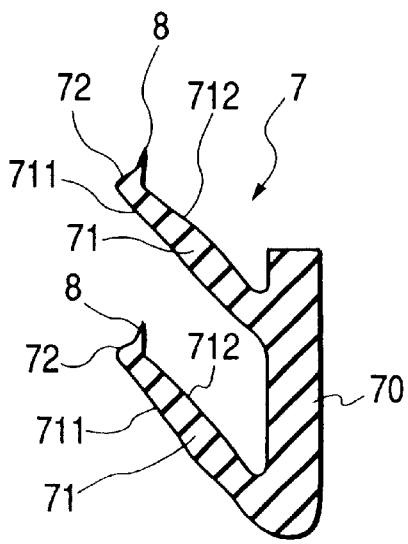
FIG. 8B shows a cross-sectional view taken along the line I—I in FIG. 8A.

Front and rear ends of the inner weather strip 6A are connected to front and rear vertical portions of the glass run 5 via molded connecting portions 7, respectively, as shown in FIG. 9. FIGS. 8A and 8B show the front end molded connecting portion 7 for the inner weather strip 6A, and the molded connecting portion 7 comprises a main body portion 70 constituting an extension to the main body portion 60 of the inner weather strip 6A and double vertically arranged seal lips 71 constituting extensions to the double vertically arranged seal lips 61 of the inner weather strip 6A without changing the shape of the latter. The molded connecting portion 7 connects to a seal lip 52 of the glass run 5 inside the passenger compartment of a vehicle at a front end thereof. Distal end lines of the seal lips 71 intersect with a distal end line of the seal lip 52 of the glass run 5 substantially at right angles. Note that there is no groove formed and no insert embedded in the main body portion 70 of the molded connecting portion 7.

As shown in FIG. 8B, a rib-like projection 72 having an angled cross section and extending linearly along a distal end line of the seal lip 71 is formed along an distal edge of each of the double vertically arranged seal lips 71 of the molded connecting portion 7 on a back or a side of the seal lip 71 which is not in contact with a window glass 104. Sides of the projection 72 on a distal edge side of the seal lip constitute sides extending from a front face 711 of the seal lip 71 which constitutes a glass contact surface in such a manner as to form a V-shape, whereas sides on the other or proximal edge side constitute sides which are substantially parallel with the main body portion 70. Then, burrs 8 which are produced when molding the molded connecting portion are present on the distal edge line of the projection 72.

Figure 8C:
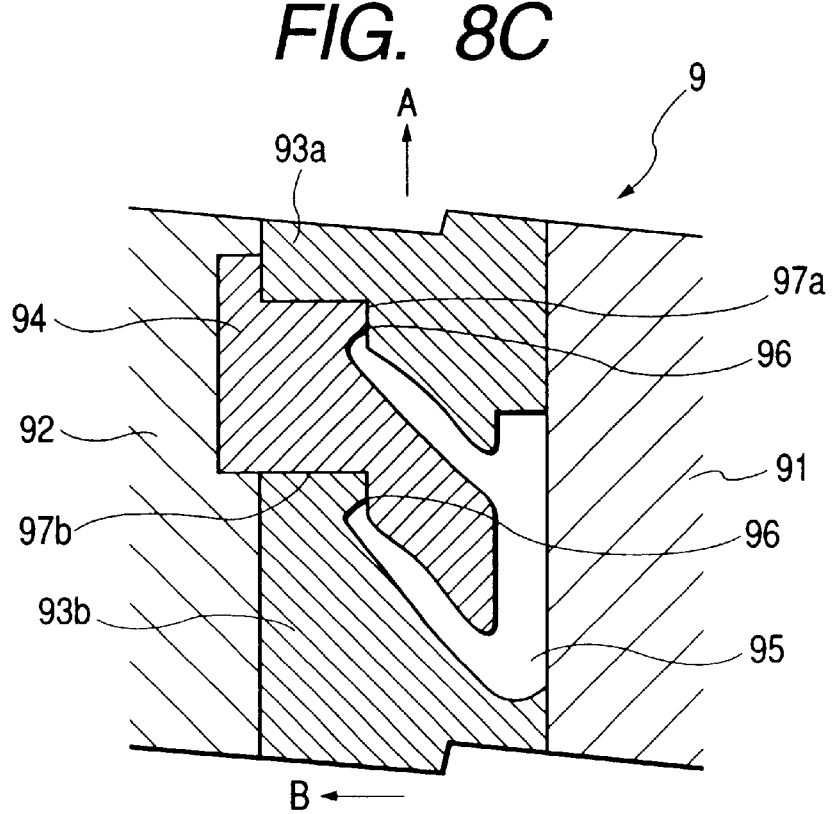
FIG. 8C shows a cross-sectional view of a mold for molding the connecting portion.

FIG. 8C shows a cross section of assembled mold members 9 for molding the molded connecting portion 7. The assembled mold members 9 comprise a stationary lower mold 91, a movable upper mold 92, a core plate 94, and upper and lower sliding molds 93a, 93b which face each other via the core plate 94, and a cavity 95 is formed which is surrounded by the stationary lower mold 91, the core plate 94 and the upper and lower sliding molds 93a, 93b.

Recessed portions 96 each having an angled cross section corresponding to the projection 72 on each of the double vertically arranged seal lips 71 are formed in portions of the cavity 95 where the distal side edge of the seal lip 71 is molded. A parting line 97a between the upper sliding mold 93a and the core plate 94 and a parting line 97b between the lower sliding mold 93b and the core plate 94 each extend horizontally relative to diagonal seal lip molding portions inside the cavity 95 and then bend to extend vertically downwardly to thereby intersect, respectively, with apex lines of the angled recessed portions 96 on one side edges thereof.

In molding the molded connecting portion 7, the glass run 5 and the inner weather strip 6A are set in the assembled mold members such that the seal lip 52 of the glass run 5 which is located inside the passenger compartment is set to face one of front and rear ends of the cavity 95 extending in a longitudinal direction (or a direction normal to the surface of FIG. 8C), whereas the front end of the inner weather strip 6A is also set to face the other end of the cavity, and a rubber material is then injected into the cavity 95. Thereafter, the upper movable mold 92 is released, the upper and lower sliding molds 93a, 93b are caused to slide in directions designated by an arrow A and an arrow B, and then the core plate 94 is pulled out. Thus, there is existing no undercut portion and therefore the mold members can be released with ease. Note that the mlded connecting portion 7 at the rear end of the inner weather strip 6A (FIG. 9) has substantially the same construction as that of the front end molded connecting portion 7 and is molded in substantially the same manner as the front molded connecting portion 7.

In the aforesaid embodiment, while the burrs 8 which are produced on the molded connecting portion 7 are made to be located on the projections 72 formed on the seal lips 71, the projections 72 may not be provided and the burrs 8 may be positioned linearly along the distal side edge of the seal lips. In this case, although the distal edge lines of the seal lips 71 constitute undercuts when the mold members are released, the mold members can be released with ease by slightly deflecting the seal lips 71.

Incidentally, all embodiments and their modifications mentioned in the specification and drawings can be combined inn various manners and under various configurations.

As has been described heretofore, according to the first aspect of the invention, the good sealing properties of the weather strip relative to the window glass can be obtained, thereby making it possible to improve the quietness inside the passenger compartment while the vehicle is running.

In addition, according to the second aspect of the invention, in addition to the operation as set forth in the first aspect, the seal lips of both the glass run portion and the inner weather strip can be made integral with each other via the molded portion with ease.

Moreover, according to the third and fourth aspects of the invention, in addition to the operation as set forth in the second aspect, it is possible to move up and down the window glass in a smooth fashion.

Furthermore, according to the fifth aspect of the invention, in addition to the operation as set forth in any of the first to fourth aspect of the invention, even in the event that there is provided the undercut portion in the seal lip of the glass run portion below the seal lip portion to facilitate the molding of the molded portion, the deterioration in sealing properties thereat can be compensated for by the auxiliary seal lip.

Still further, according to the weather strip of the invention which comprises the glass run mounted along the door frame of an automotive door and the inner weather strip mounted along the belt line of the inner door panel and mold connected to the glass run at the front and rear ends thereof, since the burrs which are produced on the seal lips of the connecting portion along the parting lines of the mold members when the connecting portion is molded are positioned so as to deviate from the contact surfaces of the seal lips with the window glass, the occurrence of a dirty glass window due to the sliding contact of the burrs with the window glass is eliminated and there is caused no risk of increasing the resistance against the sliding window glass. Additionally, since the seal lip construction is adopted in which the projections are formed on the seal lips, so that burrs are formed on distal side edges of the projections so formed, the release of the mold can be facilitated in molding the molded connecting portion. Moreover, the projection is formed into a shape in which the distal side edge of the seal lip is made slightly thicker on the back than the front thereof, this avoiding a risk of deteriorating the external appearance of the seal lip.

The present invention is not limited to the description of the modes for carrying out the invention and the embodiments thereof at all. The present invention includes various changes and modifications that can be conceived easily by those skilled in the art without departing from the scope of claim.

What is claimed is:

1. An automotive seal component, comprising:
    a glass run portion adapted to be mounted on a window frame of a door and having a seal lip;
    a seal member adapted to be disposed along a belt line portion and having a seal lip;
    a molded portion for integrally connecting at least one of front and rear ends of said seal member to said glass run portion; and
    a seal lip portion adapted to be brought into sliding contact with one side of a window glass of the door and to continuously connect said seal lip of said glass run portion with said seal lip of said seal member, wherein said seal lip of said seal member extends downwardly relative to one side of said window glass so as to come into sliding contact with one side of said window glass on a sealing portion thereof, and a lower edge of said seal lip of said seal member, being located farther than the sealing portion from said one side of the window glass, extends farther than where said seal lip abuts with said one side of said window glass in a direction in which said seal lip of said seal member goes away from said one side of said window glass, and a cut out is formed in the seal lip of the glass run portion, a first edge of the cut out being coupled with the seal lip of the seal member and a second edge of the cut out being spaced from the seal lip of the molded portion.

2. An automotive seal component according to claim 1, wherein said seal lip portion of said molded portion is formed into a closed configuration for sliding contact with said one side of said window glass at a portion where said seal lip portion of said molded portion connects to said seal lip of said seal member.

3. An automotive seal component according to claim 1, wherein the seal member is an inner weather strip.

4. An automotive seal component, comprising:
    a glass run portion adapted to be mounted on a window frame of a door and having a seal lip;
    a seal member adapted to be disposed along a belt line portion and having a seal lip;
    a molded portion for integrally connecting at least one of front and rear ends of said seal member to said glass run portion; and
    a seal lip portion adapted to be brought into sliding contact with one side of a window glass of the door and to continuously connect said seal lip of said glass run portion with said seal lip of said seal member, wherein said glass run portion has an auxiliary seal lip at a position closer to an end of said window glass than said seal lip of said glass run portion, said auxiliary seal lip extending in a direction parallel to a longitudinal direction of said seal lip of said glass run portion and adapted to be brought into sliding contact with said one side of said window glass.

5. An automotive weather strip, comprising:
    a first weather strip part mountable along a belt line of an inner door panel;
    a second weather strip part mountable along an inner circumference of a door frame;
    a molded connecting portion for connecting said first weather strip part with said second weather strip part; and
    a seal lip for wiping an inner surface of a door glass, said seal lip being provided on said first weather strip part and said molded connecting portion,
    wherein a burr produced on said seal lip of said connecting portion along a parting line between mold members at molding of said connecting portion is positioned along a distal edge on a back of said seal lip which is not in contact with said window glass.

6. An automotive weather strip, comprising:
    a first weather strip part mountable along a belt line of an inner door panel;
    a second weather strip part mountable along an inner circumference of a door frame;
    a molded connecting portion for connecting said first weather strip part with said second weather strip part; and
    a seal lip for wiping an inner surface of a door glass, said seal lip being provided on said first weather strip part and said molded connecting portion,
    wherein a burr produced on said seal lip of said connecting portion along a parting line between mold members at molding of said connecting portion is positioned along a distal edge on a back of said seal lip which is not in contact with said window glass, further comprising a rib-like projection being formed on the back of said seal lip of said molded connecting portion so as to extend along the distal edge of said seal lip, so that the burr is positioned on an apex line of said projection.

* * * * *